United States Patent [19]

Develle et al.

[11] Patent Number: 4,514,198
[45] Date of Patent: Apr. 30, 1985

[54] APPARATUS FOR PRESSURIZATION AND FILTRATION OF CONTAMINATED AIR

[75] Inventors: Guy Develle, Domont; Gerard Martin, La Garenne-Colombes, both of France

[73] Assignee: Sofiltra Poelman, La Garenne-Colombes, France

[21] Appl. No.: 473,613

[22] Filed: Mar. 8, 1983

[30] Foreign Application Priority Data

Mar. 8, 1982 [FR] France ............................ 82 03818

[51] Int. Cl.³ ............................................ B01D 50/00
[52] U.S. Cl. ...................................... 55/337; 55/431; 55/470; 55/473
[58] Field of Search ............... 55/318, 320, 321, 337, 55/431, 466, 467, 470, 472, 473, 315; 417/350; 98/2.11

[56] References Cited

U.S. PATENT DOCUMENTS

| 2,775,204 | 12/1956 | Batten et al. | 417/350 |
| 3,008,542 | 11/1961 | Steele | 55/470 |
| 3,618,303 | 11/1971 | Nagel | 55/337 |
| 3,877,454 | 4/1975 | Axmann et al. | 55/337 |
| 4,204,848 | 5/1980 | Schulmeister et al. | 55/315 |
| 4,348,057 | 9/1982 | Parenti et al. | 55/337 |

FOREIGN PATENT DOCUMENTS 2014239  8/1979  United Kingdom ............... 417/350

*Primary Examiner*—David L. Lacey
*Attorney, Agent, or Firm*—Young & Thompson

[57] ABSTRACT

This invention describes apparatus for pressurization and filtration of contaminated air for a vehicle or mobile dwelling capable of containing several persons, especially if the contamination is of nuclear, biological and chemical origin. The apparatus comprises an air loop extending between a contaminated air intake and a processed air outlet, comprising two cyclone precleaners, a filter and an air circulation blower. The apparatus also comprises a dust loop extending between the dust outlets of the prefilters and a dust outlet and comprising a dust discharge blower. In this apparatus, the blowers are coupled to an identical driving device, and the intake of the first blower is situated close to the air outlets of the cyclone precleaners.

9 Claims, 6 Drawing Figures

APPARATUS FOR PRESSURIZATION AND FILTRATION OF CONTAMINATED AIR

BACKGROUND OF THE INVENTION

The present invention relates to apparatus for pressurization and filtration of contaminated air for a vehicle or mobile dwelling capable of containing several persons, especially if the contamination is of nuclear, biological or chemical origin.

Plants of this nature are known, which commonly comprise a dust separator system, a filter and a blowing and pressurization blower referred to as the first blower, with an air circuit, and which also comprise a dust ejector blower referred to as the second blower, within a dust circuit extending between a dust outlet from the said separator system and an egress.

As a rule, these apparatus have as their disadvantages that they are particularly bulky, comprise leakage sources and are of comparative low efficiency.

As a matter of fact, the aforesaid elements are most frequently interconnected via piping, valves and other separating members. Furthermore, the two blowers each have their own driving means.

It is an object of the invention to provide a particularly compact pressurizing apparatus, the connectors of which are kept down to the strict minimum and whereof the efficiency is sufficiently high.

SUMMARY OF THE INVENTION

To achieve this and other objects, said first and second blowers are coupled to one and the same driving means, the intake of at least one of the blowers being situated close to one of said outlets.

In one embodiment of the invention, the intake of the first blower is situated close to the air outlet of the dust separator system.

Due to these arrangements, the bulk of the apparatus is reduced considerably compared with apparatus known in the art, since use is made of a single driving device.

Furthermore, the size of the first circuit is reduced considerably since the intake of the first blower is situated close to the air outlet of the dust separator system.

These arrangements render it possible to build a particularly compact and effective pressurizing and filtering apparatus. Moreover, the application of one driving device only for both blowers allows the energy efficiency of the plant to be improved while lowering its purchase rice and maintenance costs.

In another embodiment of the invention, the intake of the second blower is situated close to the dust outlet from the dust separator system.

Due to this system, the size of the dust circuit is reduced considerably, which is advantageous as regards reducing the bulk apparatus of this general nature.

BRIEF DESCRIPTION OF THE DRAWINGS

In order that the invention may be more clearly understood, reference will now be made to the accompanying drawings which show certain embodiments thereof by way of example and in which.

DETAILED DESCRIPTION OF THE PREFERRED EMBODIMENTS

Figure 1:
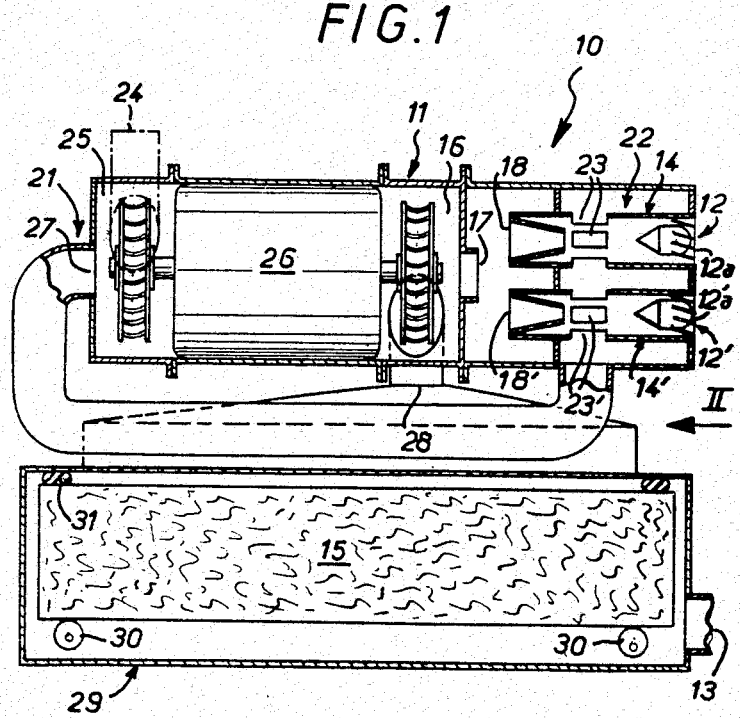
FIG. 1 is diagrammatical view in longitudinal cross-section along the line I—I of FIG. 2 of a first embodiment of apparatus in accordance with the invention.

Referring now to the drawings according to the embodiment selected and illustrated in FIG. 1, a pressurizing and filtering apparatus 10 comprises an air circuit 11 extending between two air intakes 12,12' and an air outlet 13.

The air circuit referred to as the first circuit, comprises two dust separator means, constituted by cyclone precleaners diagrammatically illustrated at 14,14', a filter 15 situated downflow of a first blower 16, the intake 17 of this latter being situated close to the outlets 18,18' of the cyclones 14,14'.

In the embodiment selected and illustrated in FIG. 1, the cyclones are of the same kind as those forming the subject of French Pat. No. 71.22,431 in the name of Sofiltra-Poelman.

The apparatus 10 also comprises a dust circuit 21 extending between a chamber 22 into which dust outlets 23,23' lead, from the cyclones 14,14', and a dust egress 24. The circuit 21 comprises a second blower 25 for dust takeup and ejection.

In accordance with the invention, the first and second blowers 16,25 are coupled to the same driving device 26. In this embodiment, the blowers are co-axial and situated at either side of the said driving device 26.

The driving device 26 is an electric motor in this case.

Figure 3:
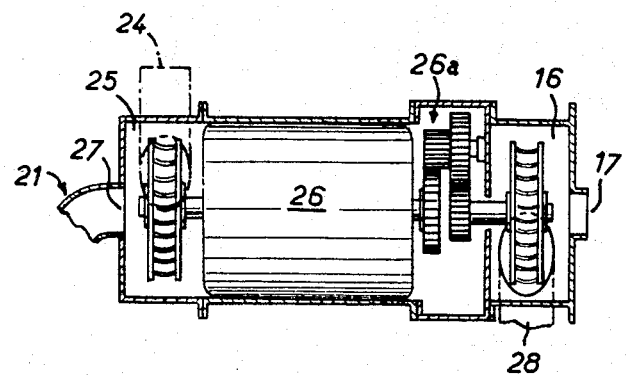
Figure 4:
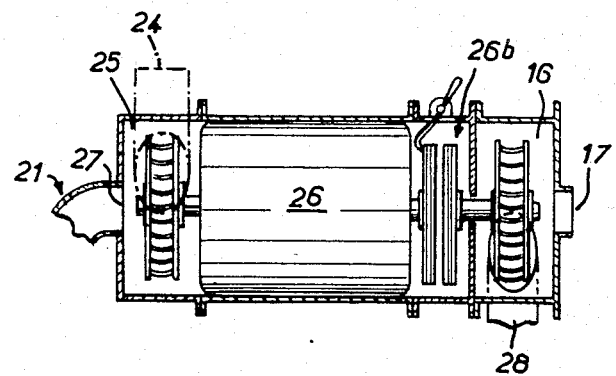

In other embodiments shown in FIGS. 3 and 4 the driving device 26 may comprise a reduction gear or step-up gear 26a (FIG. 3) or a clutch 26b (FIG. 4).

In accordance with the invention, the blowers 16 and 25 are of the centrifugal type, that is to say that their intakes 17,27 are axial, whereas their outlets 28,24 are tangential.

Figure 5:
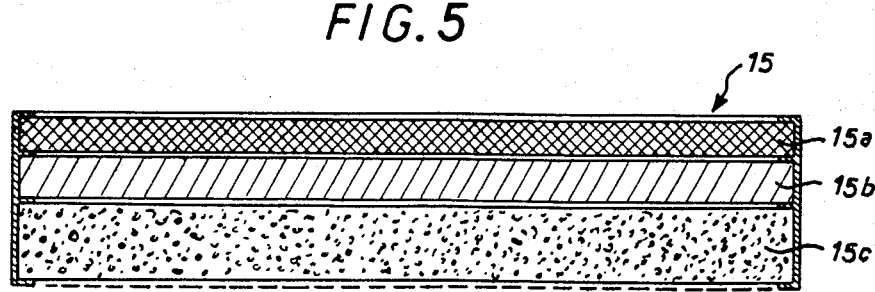
FIG. 5 is a view in longitudinal cross-section of the filter of FIG. 1.

In the example illustrated, the filter 15 comprises a first filter stage 15a followed by an anti-aerosol stage 15 and by an anti-vapor stage 15c (FIG. 5), but it is obvious that other kinds of integrated filters combining the anti-aerosol and anti-vapor functions may be utilized without departing from the scope of the invention. In this embodiment, the filter 15 is housed within a casing 29 situated in the first circuit 11. It is immobilized in this casing by means of a system of cam shafts illustrated diagrammatically at 30. A rectangular joint 31 seals the filter 15.

During operation, air is allowed to enter into the intakes 12,12' of the cyclones 14,14'. It is put into rotation by blading illustrated diagrammatically at 12a and 12'a. Because of this the dusts are centrifuged and ejected via the outlets 23,23' into the chamber 22, whereas the dedusted air is drawn in by the blower 16 and passes through the air outlets 18,18' of the cyclones 14,14' and the intake 17 of the blower 16.

The dedusted air is discharged from the blower 16 via its outlet 28 and fed into the filter 15.

The air is thereupon filtered through three filter stages 15a, 15b, and 15c. The air is thereupon allowed to pass into the living compartment via the outlet 13.

The dusts are drawn in by the blower 25 from the chamber 22 and up to the outlet 24 through which they are discharged.

In this embodiment, the filter 15 may be replaced easily. It is sufficient to free the cam shaft devices 30 and to undertake the replacement of the filter thereupon.

Another modified embodiment of the pressurizing apparatus will now be described with reference to FIG. 6. In this description, the elements common to FIGS. 1 and 6 retain the same references, whereas the elements of FIG. 6 equivalent to those of FIG. 1 have been given the same references with the addition of the letter A.

Figure 6:
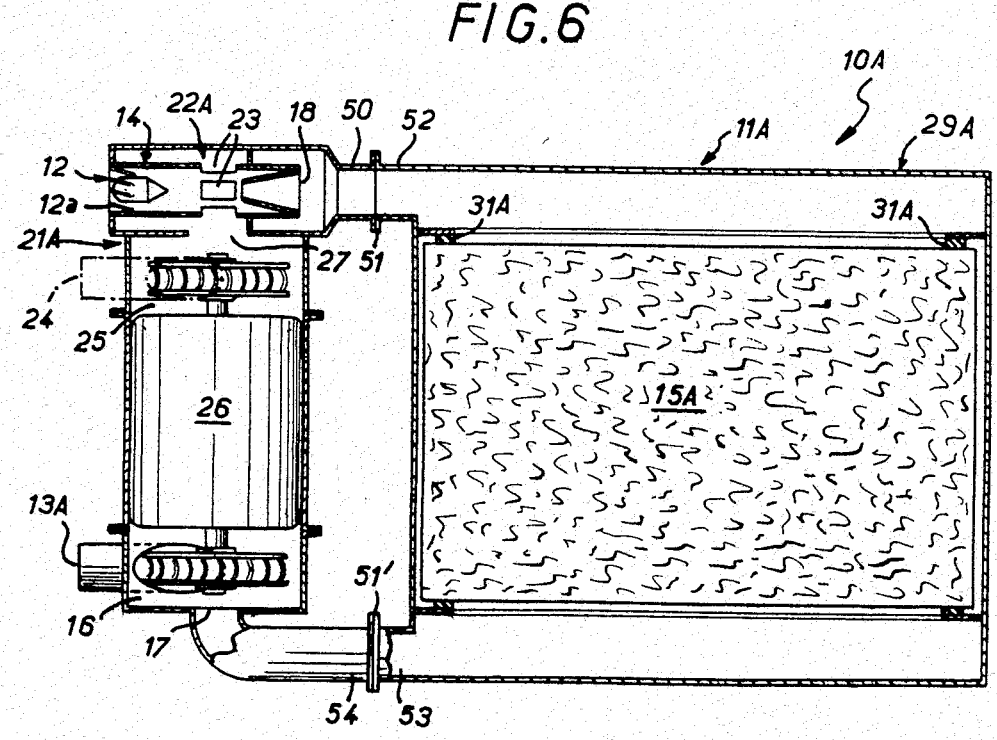
FIG. 6 is a diagrammatical view in longitudinal cross-section of another embodiment of the apparatus.

Referring now to FIG. 6, an air circuit 11A extends between an intake 12 and an outlet 13A. This circuit, referred to as the first circuit, comprises a cyclone illustrated diagrammatically at 14, the air egress 18 of which leads into a pipe 50. This pipe 50 comprises a connector 51 to an input pipe 52 of a casing 29A comprising a filter 15A of analogous structure to that of the filter 15. The casing 29A comprises an outlet pipe 53 comprising a device for rapid connection 51' to a pipe 54. This pipe is connected to the intake 17 of a first blower 16.

Joints 31A seal the filter 15A.

The apparatus comprises a dust circuit 21a, referred to as the second circuit, extending between a chamber 22A and an outlet 24. The circuit 21A comprises a second blower 25 for uptake and discharge of the dusts.

In accordance with the invention, the intake 27 of this blower is situated in direct proximity to the dust outlet 23 of the cyclone 14. It should be emphasized at this juncture, that in this modified embodiment, it is the intake of the second blower which is situated in direct proximity to the dust outlet of the cyclone, whereas in the modified embodiment described earlier, it is the intake 17 of the first blower which is situated in direct proximity to the air outlet of the cyclones 14,14'.

It should also be observed that in this modified embodiment, both blowers operate by suction and delivery, whereas in the modified embodiment described earlier, the first blower was situated upflow of the filter 15A.

The operation is analogous to that of the embodiment described earlier.

The air to be processed is drawn in by the first blower 16 and passes through the cyclone 14 and the filter 15A. It is discharged into the living compartment of the vehicle via the outlet 13A.

The dusts are centrifuged in the cyclone 14 and discharged via the outlets 23. They are drawn in from the chamber 22A by the second blower 25 and discharged via the outlet 24.

The replacement of the filter 15A may be performed by freeing the connectors 51 and 51' and by locking in another casing 29A containing a fresh filter 15A.

This form of application of the present invention renders it possible to reduce the dust circuit 21A to the strict minimum. The result of the smaller bulk of the dust circuit as well as of the utilization of one and the same driving device 26 for both blowers 16 and 25, is that the pressurizing and filtering apparatus in accordance with the present invention is particularly compact and effective.

Figure 2:
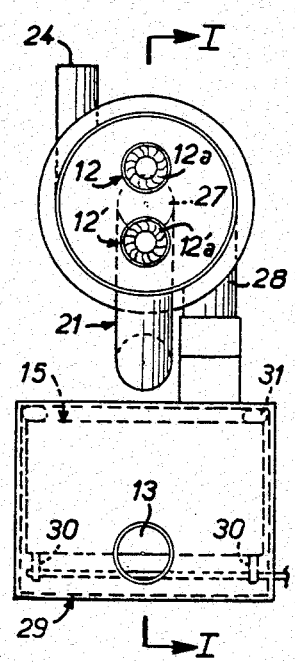
FIG. 2 is a side view corresponding to the arrow II of FIG. 1, FIGS. 3 and 4 are illustrations in longitudinal cross-section and diagrammatical manner of modified embodiments of the driving device of FIG. 1.

The same applies in the embodiment described and illustrated in FIGS. 1 and 2, in which the length of the first circuit 11 is reduced considerably since the intake of the blower 16 is situated in direct proximity to the air outlets 18,18' of the cyclones 14,14'.

It will be apparent that the invention is not limited to the embodiments described and illustrated but encompasses all variations of embodiment and/or application as defined by the appended claims.

We claim:

1. In an apparatus for the pressurization and filtration of contaminated air, comprising at least one dust separator having a contaminated air inlet and a dust outlet and an air outlet, at least one filter in flow communication with said air outlet so as to receive air from said air outlet, a first blower positioned and arranged for forcing the latter air through the at least one filter, a second blower in flow communication with said dust outlet so as to receive dust from said dust outlet and evacuates the latter dust from the apparatus; the improvement comprising a single driving device, said first and second blowers being coupled to said single driving device at either side thereof, the intake of at least one of said first and second blowers being positioned and arranged close to one of said air outlet and dust outlet.

2. Apparatus according to claim 1, in which said driving device comprises step-up gearing means coupled to at least one of said blowers.

3. Apparatus according to claim 1, in which said driving device comprises reduction gearing means coupled to at least one of said blowers.

4. Apparatus according to claim 1, in which said driving device comprises at least one clutch coupled to at least one of said blowers.

5. Apparatus according to claim 1, in which said dust separator comprises at least one cyclone.

6. Apparatus according to claim 5, in which said first blower is disposed between said air outlet and said at least one filter, the intake of said first blower being situated close to said air outlet.

7. Apparatus according to claim 5, in which said at least one filter is situated between said air outlet and said first blower, the intake of said second blower being situated adjacent to said dust outlet.

8. Apparatus according to claim 5, wherein said at least one cyclone comprises a plurality of cyclones in parallel with each other.

9. Apparatus according to claim 1, in which said driving device is an electric motor.

* * * * *